United States Patent [19]

Hughes et al.

[11] Patent Number: 5,336,870
[45] Date of Patent: Aug. 9, 1994

[54] SYSTEM FOR REMOTE PURCHASE PAYMENT TRANSACTIONS AND REMOTE BILL PAYMENTS

[76] Inventors: Thomas S. Hughes, 31310 Eagle Haven Cir., Ste. 100, Rancho Palos Verdes, Calif. 90274; Gustavo Molina, 24292 Rhona Dr., Laguna Niguel, Calif. 92656

[21] Appl. No.: 888,780

[22] Filed: May 26, 1992

[51] Int. Cl.$^5$ ............................................. G06F 15/30
[52] U.S. Cl. .................................. 235/379; 235/380; 902/24
[58] Field of Search ................... 235/379, 380; 902/24

[56] References Cited

U.S. PATENT DOCUMENTS

| | | |
|---|---|---|
| 4,053,735 | 10/1977 | Foudos . |
| 4,341,951 | 7/1982 | Benton . |
| 4,454,414 | 6/1984 | Benton . |
| 4,536,647 | 8/1985 | Atalla . |
| 4,575,621 | 3/1986 | Dreifus . |
| 4,652,698 | 3/1987 | Hale . |
| 4,678,895 | 7/1987 | Tateisi . |
| 4,689,478 | 8/1987 | Hale . |
| 4,815,031 | 3/1989 | Furukawa . |
| 4,839,504 | 6/1989 | Nakano . |
| 5,050,207 | 9/1991 | Hitchcock . |

*Primary Examiner*—Harold Pitts
*Attorney, Agent, or Firm*—Lee W. Tower

[57] ABSTRACT

It is the object of this invention to provide a terminal and system to allow debit and credit card holders the ability to conveniently perform various transactions from their home or office. The terminal is a single device, which has an alphabetic QWERTY keyboard, a numeric touch tone type keypad, miscellaneous other keys, a magnetic card reader, a display, a printer, a modem, and a serial port. The terminal firmware supports various financial transactions including: purchase payment, bill payment, and settlement review. The terminal supports initialization, encryption, transaction generation, transaction transmission and data reception from a host system and receipt printing. A local data base including a transaction log and a profile list are maintained in the terminal memory. The transaction log stores purchase payment information and is stored as a stack and the profile list has entries for each specific bill pay account.

5 Claims, 13 Drawing Sheets

190

```
PURCHASE PAYMENT TRANSACTION RECEIPT
<TERMINAL NAME>
<TERMINAL ADDRESS>
<TERMINAL CITY STATE>
DATE MM/DD/YY  TIME HH:MM
AMOUNT       : $<AMOUNT>
ACCOUNT #    : <ACCOUNT NUMBER>/EXPIRE DATE
TERMINAL#    : <TERMINAL NUMBER>
MERCHANT #   : <MERCHANT ID>
TRACE#       : <TRACE ID>
ITEM#        : <PURCHASED ITEM IDENTIFIER>
ACCOUNT      : <ACCOUNT TYPE> SAVINGS,
                 CHECKING
SEQUENCE#    : <SEQUENCE NUMBER>
AUTH NUMBER  : <AUTHORIZATION NUMBER FROM
                 HOST>
               <APPROVED OR DENIED>
REFERENCE#   : <RETRIEVAL REFERENCE NUMBER>
MERCH. NAME  : <MERCHANT DESCRIPTION>
```

FIG. 6

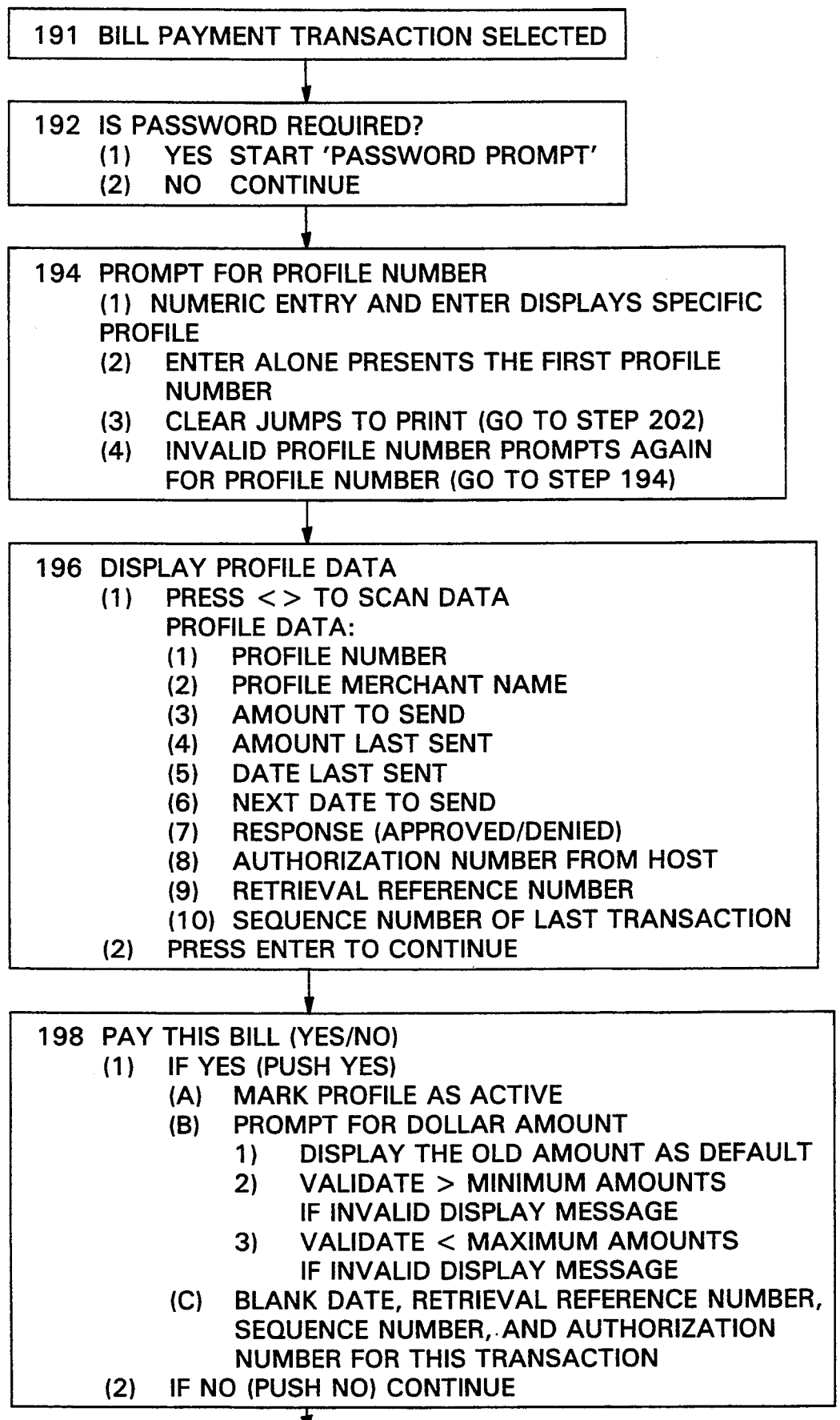

224

```
BILL PAYMENT TRANSACTION RECEIPT
<TERMINAL NAME>
<TERMINAL ADDRESS>
<TERMINAL CITY STATE>
DATE MM/DD/YY  TIME HH:MM
ACCOUNT#  : <ACCOUNT NUMBER>/EXPIRE DATE
TERMINAL# : <TERMINAL NUMBER>
ACCOUNT       : <ACCOUNT TYPE> SAVINGS,
                CHECKING
=========PROFILE DATA========

== <MERCHANT NUMBER>     ==
== <MERCHANT NAME>       ==
AMOUNT        :         $_____
AUTH NUMBER : <AUTHORIZATION NUMBER FROM
                   HOST>
              <APPROVED OR DENIED>
SEQUENCE#    : <SEQUENCE NUMBER>
REFERENCE#   : <RETRIEVAL REFERENCE
                   NUMBER>

.
               .
               .

== <MERCHANT NUMBER>     ==
== <MERCHANT NAME>       ==
AMOUNT        :         $_____
AUTH NUMBER : <AUTHORIZATION NUMBER FROM
                   HOST>
              <APPROVED OR DENIED>
SEQUENCE#    : <SEQUENCE NUMBER>
REFERENCE#   : <RETRIEVAL REFERENCE
                   NUMBER>

===========================

TOTAL APPROVED:         $_____
```

```
SETTLEMENT REVIEW RECEIPT
<TERMINAL NAME>
<TERMINAL ADDRESS>
<TERMINAL CITY STATE>
DATE MM/DD/YY  TIME HH:MM
TERMINAL#    : <TERMINAL NUMBER>
    CREDIT TRANSACTIONS
       SALES COUNT    : XXXX
       SALES AMOUNT   : $XXXXX.XX
       RETURN COUNT   : XXXX
       RETURN AMOUNT  : $XXXXX.XX
    DEBIT TRANSACTIONS
       SALES COUNT    : XXXX
       SALES AMOUNT   : $XXXXX.XX
       RETURN COUNT   : XXXX
       RETURN AMOUNT  : $XXXXX.XX

NET COUNT       : XXXX
       NET AMOUNT      : $XXXXX.XX

HOST TOTALS IF TERMINAL NOT IN BALANCE WITH
HOST

HOST TOTALS
    CREDIT TRANSACTIONS
       SALES COUNT    : XXXX
       SALES AMOUNT   : $XXXXX.XX
       RETURN COUNT   : XXXX
       RETURN AMOUNT  : $XXXXX.XX
    DEBIT TRANSACTIONS
       SALES COUNT    : XXXX
       SALES AMOUNT   : $XXXXX.XX
       RETURN COUNT   : XXXX
       RETURN AMOUNT  : $XXXXX.XX

NET COUNT       : XXXX
       NET AMOUNT      : $XXXXX.XX
```

FIG. 10

SYSTEM FOR REMOTE PURCHASE PAYMENT TRANSACTIONS AND REMOTE BILL PAYMENTS

FIELD OF THE INVENTION

This invention relates to a terminal and system for home or office initiated purchase payment transactions, bill payment transactions and other electronic transactions.

BACKGROUND OF THE INVENTION

Currently point of sale terminals have become common at such locations as: Carl's Jr., a fast food restaurant, Hughes grocery markets, and ARCO gas stations. To operate these point of sale terminals the user is prompted to insert his or her debit ATM (automatic teller machine) card or credit card into a terminal card reader located at the site of the purchase and then is prompted for his or her PIN (personal identification number) and then the user enters the amount of the purchase or the amount of the purchase may be automatically supplied by the register at the Carl's Jr. or the pump at the ARCO station. If approved by a remote host computer, funds are automatically transferred from the user's account to the merchant's account. Alternately, if the purchase is made with a credit card, then the amount of the purchase is automatically debited to the user's credit card. These point of sale terminals located at a merchant are designed to have a limited function and are convenient to use for that limited function; however, to be more useful it is necessary to have a system and terminal with additional functions.

Various portable terminals are in the prior art; however, they have various limitations. For example, U.S. Pat. No. 5,050,207 discloses a portable automated teller machine with transducers to couple to a host bank computer via a telephone handset of any phone. It allows the user to securely access bank and bank accounts and to securely effect either interaccount transfers or bill payments; however the device has no alphabetic keyboard, printer or magnetic card reader. U.S. Pat Nos. 4,689,478, 4,652,698, 4,536,647, and 4,454,414 for portable terminals have some of the same limitations.

U.S. Pat No. 4,341,951 has a mechanism for printing on a vendor voucher, but assumes that the terminal is portable and taken to the merchant, which is highly inconvenient and negates the concept of electronic shopping.

The current devices are not convenient or general purpose enough. For example, there is generally no convenient way to enter alphabetic data on these terminals. They are optimized for numeric data such as PIN and amount data. An example, is the popular VERIFONE, which like the devices above has a touch tone type keypad with the ten digits and "*" and "#". As is normally the case on telephones touch tone keypads, letters are associated with each digit. For example, the letters "A", "B" and "C" are associated with the digit "2". It is possible to enter a letter by going into an alphabetic mode and by pressing the "2" key once, twice or thrice to pick a letter to enter; however, this is very inconvenient, and therefore limits the usefulness of these terminals.

The user in the home needs more functions than the typical point of sale terminal or VERIFONE provide. For example, most individuals pay monthly bills by writing checks and mailing or delivering them. It would be desirable to have a terminal in the home that could provide this function in a convenient manner. It would also be desirable to have the ability to pay for purchases immediately upon selecting an item to purchase, for instance an item in a catalog. This would speed delivery for the consumer and provide better cash flow for the merchant. Also, it would be more convenient and secure if the user did not have to give a credit card number directly to an operator or salesperson.

SUMMARY OF THE INVENTION

It is therefore the object of this invention to provide a terminal and system to allow debit and credit card holders the ability to conveniently perform various transactions from their home or office. The terminal is a single device, which has an alphabetic QWERTY keyboard, a numeric touch tone type keypad, miscellaneous other keys, a magnetic card reader, a display, a printer, a modem, and a serial port.

The terminal firmware supports various financial transactions including: purchase payment, bill payment, and settlement review. The terminal supports initialization, encryption, transaction generation, transaction transmission and data reception from a host system and receipt printing. Encryption of the PIN is performed with a derived unique key per transaction (DUKPT) algorithm.

A local data base including a transaction log and a profile list are maintained in the terminal memory. The transaction log stores purchase payment transaction information and is accessible as a stack with the most recent transaction on top of the stack. The profile list has entries for each specific bill pay account.

BRIEF DESCRIPTION OF THE DRAWINGS

A better understanding of the invention and its advantages will be apparent from the detailed description taken in conjunction with the accompanying drawings in which:

FIG. 6 is the format of a purchase payment transaction receipt.

FIGS. 7A, 7B and 7C are a flow chart for a bill payment transaction.

FIG. 8 is the format of a bill payment transaction receipt.

FIG. 10 is the format of a settlement review receipt.

DESCRIPTION OF THE PREFERRED EMBODIMENTS

Figure 1:
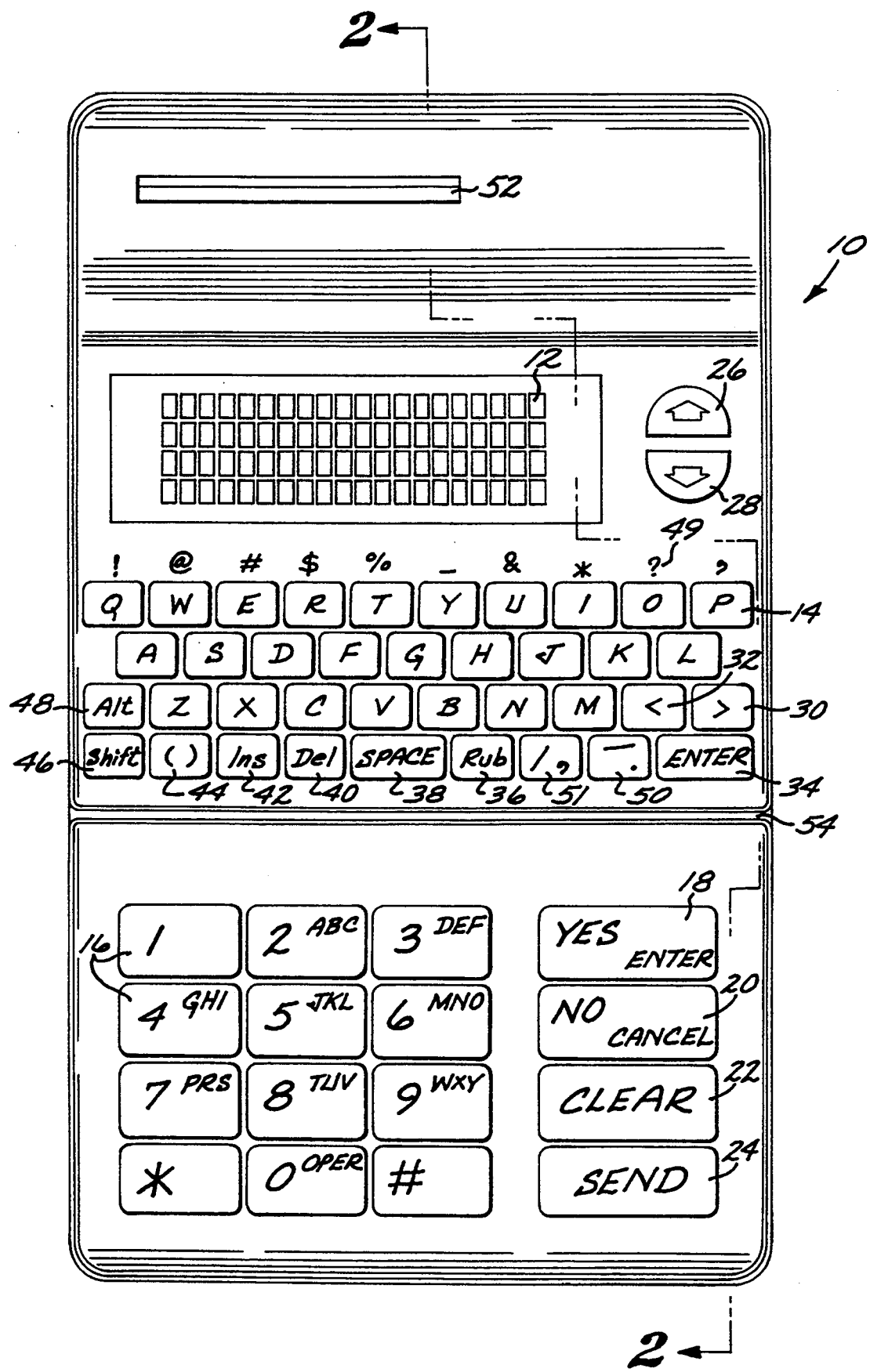
FIG. 1 is a top view of the terminal in accordance with the invention.

Referring now to the drawings, and more particularly, to FIG. 1, there is shown a top view of the terminal 10 in accordance with the invention. The terminal has a display 12, a qwerty alphabetic keyboard 14, a numeric keypad 16, and a magnetic card reader slot 54. Miscellaneous keys include: YES/ENTER key 18, NO/CANCEL key 20, CLEAR key 22, SEND key 24, up key 26, down key 28, left key 30, right key 32, ENTER key 34, rubout (Rub) key 36, space key 38, delete (DEL) key 40, insert (INS) key 42, parenthesis key 44, shift key 46, and alt key 48. A set of miscellaneous symbols 49 are available on the upper row of qwerty keys by using the alt key 48. Also available are the "—", "." key 50 and the "/", "," key 51.

Figure 2:
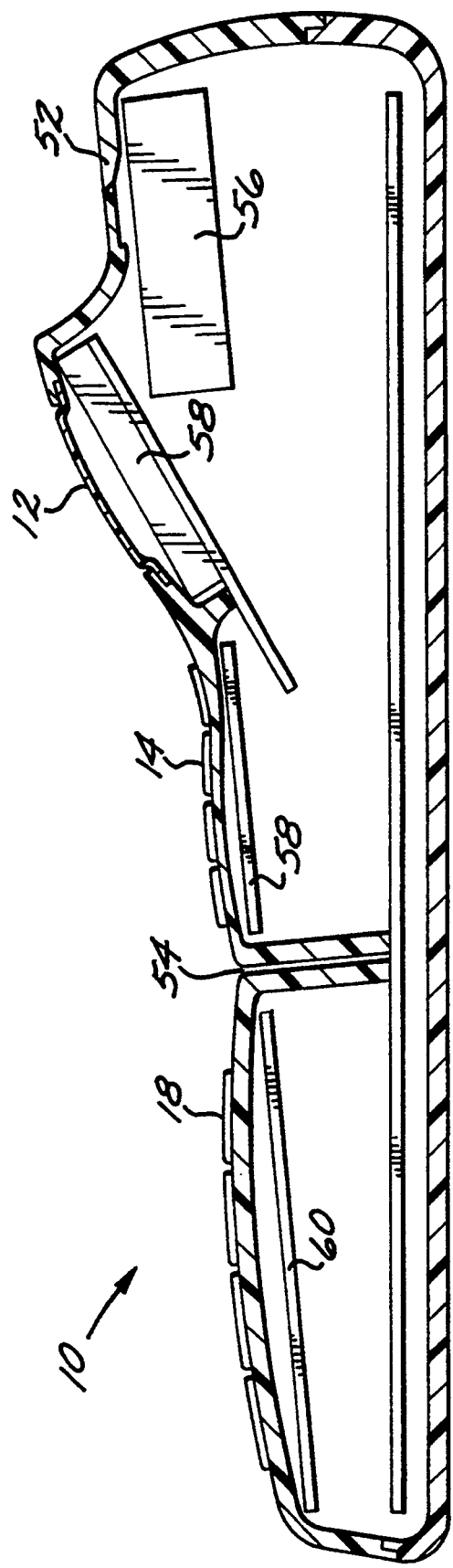
FIG. 2 is a sectional side elevation view of the terminal taken along section 2 of FIG. 1.

FIG. 2 is a sectional side elevation view of the terminal. In FIG. 2 the magnetic card reader slot 54 between the qwerty alphabetic keyboard 14 and the numeric keypad 16 is evident, as is paper slot 52. Also shown in FIG. 2 are the locations of the printer 56, liquid crystal display (LCD) module 58, alphabetic keypad module 60 and numeric keypad module 62.

The display 12 in one embodiment is a liquid crystal with 20 characters×4 lines and is a supertwist, reflective display with black foreground on yellow/green background. Scrolling through the display is accomplished by using the left key 30, right key 32, down key 28, and up key 26.

The printer 56 is fed paper from a paper roll, which would be attached to the terminal. In one embodiment the printer would be a thermal type with a 7×5 character dot matrix. The printer can be implemented with a SEIKO MTP-201.

The magnetic card reader positioned alongside magnetic card reader slot 54 is a hand swipe, bidirectional type, and conforms to A.B.A. track II standard and can be implemented with a MAGTEK 21006505 I.C.

Figure 3:
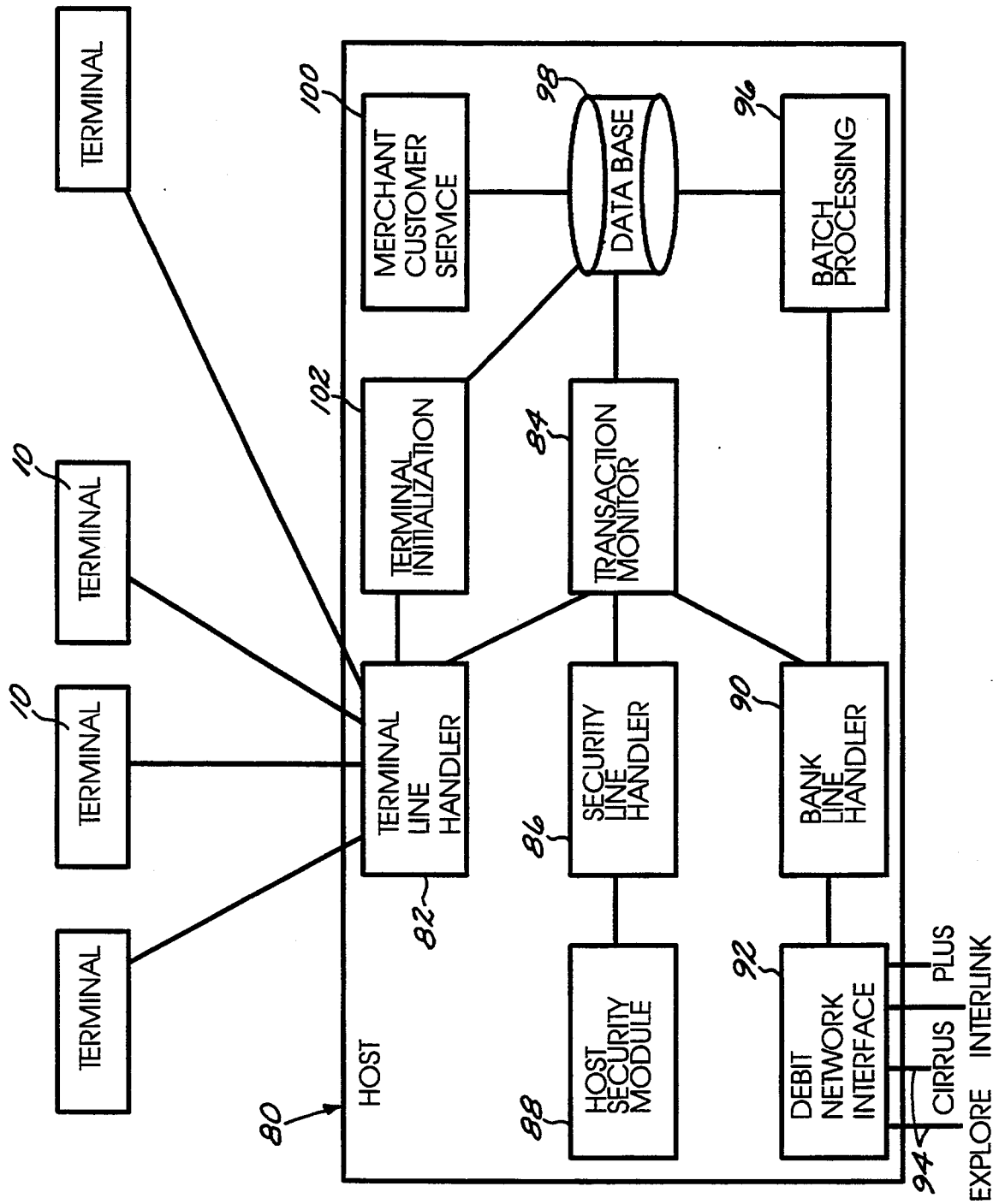
FIG. 3 is a diagram showing the entire system in accordance with the present invention.

The overall system is shown in FIG. 3. The host system 80 is the engine that receives the terminal requests and manages the bank link interactions and consists of computers, modems, and communication drivers. Message traffic is predominantly initiated from the terminal 10 located in homes or offices. Transaction requests are connected to the host system 80 processing center through terminal line handler processes 82. The terminal line handler 82 process translates the terminal message format to an internal format used within the host system 80. These standardized messages are then passed to the transaction monitor 84 process, which determines the requirements of the request. If a PIN needs translation the transaction monitor 84 requests this from the security line handler 86, which is connected to a host security module 88 that performs all PIN translations. A PIN is always encrypted for transmission between secure zones. Encryption can be performed with a Racal Guardata RG6000.

The bank line handler 90 presents the request messages to the authorizing institution, which may be via debit network interface 92 to a debit networks 94, after translating the internal message format to the proper format. The response of that request is then sent directly back to the terminal line handler 82 process for return to the terminal 10. There is a bank line handler 90 for each link to each bank including the debit network, which could for example, include: EXPLORE, CIRRUS, INTERLINK, and PLUS.

The transaction monitor 84 process is responsible for all message switching decisions and required disk input/output for the host system 80. The transaction monitor 84 accepts requests from the terminal line handler 82 and bank line handler 90 and initiates requests to the security line handler 86 and bank line handler 90. It verifies the terminal, merchant and card as appropriate and will perform any standing processing required by the host system 80.

Additional message traffic can be initiated by the financial institution in the form of network control messages and key management requests. Requests are generated by batch processes and from customer and merchant support functions. These requests are channeled to the appropriate locations and replies are returned depending on the type of transaction being performed.

The terminal initialization 102 process provides terminal initialization of customer information. Merchant and customer service 100 provides the following information: transaction detail that can be inquired on by a merchant or a terminal; date and time; merchant setup information; and terminal setup information.

The batch processing 96 system provides settlement initiation to the associated bank line handler 90 processes and reports for the host system 80 can also be created from this process.

Figure 4:
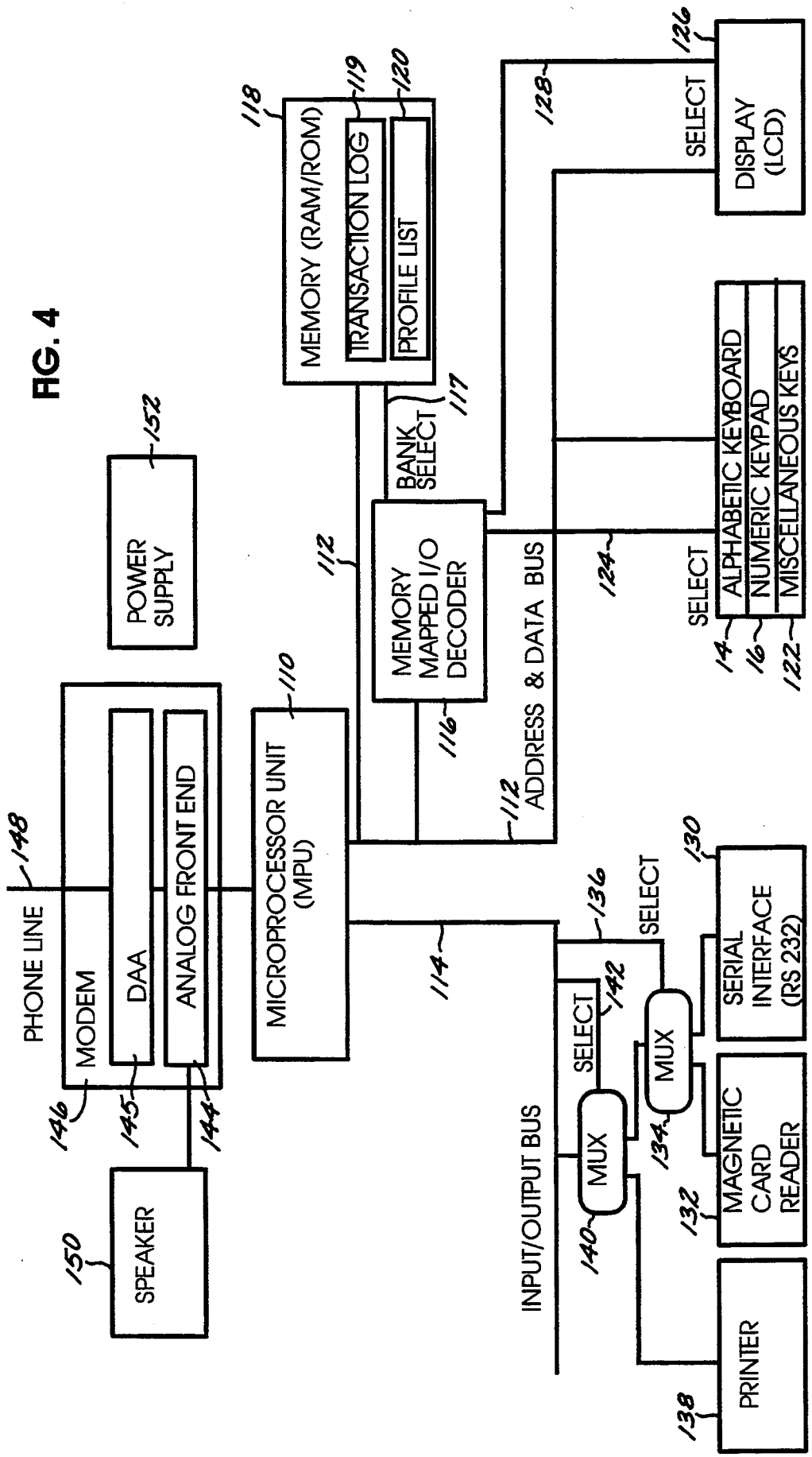
FIG. 4 is a functional block diagram of the terminal in accordance with the present invention.

FIG. 4 is a functional block diagram of the terminal 10. A microprocessor unit 110, which can be implemented as an INTEL 8096, has interfaces with the remainder of the functional elements via three interfaces: an interface to a modem 146, address and data bus 112 and input/output bus 114.

The modem 146 comprises an analog front end 144, which is linked to a DAA 145 that is an interface that isolates the analog front end 144 from the phone line 148. The modem 146 is coupled to phone line 148 and has the following protocols: CCITT V.22 bis with 2400 bps synchronous and asychronous and 1200 bps synchronous and asynchronous; CCITT V.22 A & B with 1200 bps synchronous and asynchronous; Bell 212A with 1200 bps synchronous and asynchronous; and CCITT V.21 / Bell 103 with up to 300 bps asynchronous. The analog front end 144 can also drive a speaker 150.

The address and data bus 112 is decoded by a memory mapped I/O decoder 116, which determines the sources and destinations for the address and data bus 112 including: memory 118, which has both random access memory (RAM) and read only memory (ROM) and has a plurality of banks selected by bank select 117; qwerty alphabetic keyboard 14, numeric keypad 16 and miscellaneous keys 122, which are enabled via select 124; and display 126, which is enabled via select 128. The memory 118 has 64K bytes, which is allocated to the program for the microprocessor unit 110 and the transaction log 119 and profile list 120.

The input/output bus 114 communicates via multiplexer 140 and multiplexer 134 to printer 138, magnetic card reader 132 and serial interface 130. The RS232 serial interface is 300, 600, 1200, 2400, 4800, or 9600 baud, and has a XON-XOFF feature available.

Power is supplied by power supply 152, which uses normal wall power and a backup 3 volt lithium battery for non volatile memory support.

The terminal 10 requires software initialization for key information, dynamic customer dependent information and host initiated updates. After final assembly and test the terminal 10 is injected with the encryption key and terminal number. The Key injection is done by external connection to a Remote Key Injection Facility (RKIF), which is a secure device to inject the key information needed for handling PIN data. The base derivation key is the key used as a seed for injection into the terminals from the RKIF.

After purchase there are a series of functions that the terminal performs for initialization with the host system 80. First, the customer supplies customer information to the host system 80. On connection to the host system 80 via modem 146, the host system 80 reads the terminal serial number and validates it. Then the host system 80 loads the terminal with the customer name and address.

The terminal can then be updated based on information available to the host during the course of another transaction. For example: (a) the terminal 10 initiates a call to the host system 80 for another function; (b) host system 80 completes original transaction and notifies terminal that additional information is available, such as: changes to existing customer information; additions and deletions to the bill payment profiles; or software modifications in areas that are not protected.

The terminal is protected from undesired software changes by detecting any difference between a calculated checksum and a stored checksum. If there is any difference, then the following actions take place: the internal encryption key is erased; most of the internal software is erased or destroyed to be made unfunctional; the display is set to ask the user to call customer service in a unique way; and the terminal will initiate one call and notify the host of the current state and report the terminal number. Other software checks include a check code included with all merchant numbers, which is validated prior to acceptance and validation that all amount entries are within range and any entry outside of that range must be reentered.

The terminal maintains internal counters and status registers that are available to the host when requested at the end of a normal transaction. They include: total number of transaction requests; total number of encryptions; total number of approved transactions, which is a called a sequence number: last retrieval reference number received by the terminal: total dollar amount and transaction count for current date: and total dollar amount and transaction count for the last N days, where N could be 7 days for a week. The sequence number internal counter can be stored in memory 118 and is incremented by the microprocessor unit 110 when a transaction is approved. The sequence number can be used to track each approved transaction for the terminal.

The terminal manages a local data base including a transaction log and a profile list. Each of these are as large as the memory permits. The characteristics of these data bases are as follows:

1. TRANSACTION LOG
   CONTENTS - The transaction structure contains all the information for purchase payment transactions.
   (1) date mm/dd/yy time hh:mm
   (2) amount: $<amount>
   (3) account #: <account number>/expire date
   (4) terminal#: <terminal number>
   (5) merchant #: <merchant id>
   (6) trace#: <trace id>
   (7) item#: <purchased item identifier>
   (8) account: <account type> savings, checking
   (9) sequence#: <sequence number>
   (10) authorization number: <authorization number from host> <approved or denied>
   (11) reference#: <retrieval reference number>
   (12) merchant name: <merchant description>
   STRUCTURE - This file is a stack with the most recent transaction on the top.
2. PROFILE LIST
   CONTENTS - The profile structure contains:
   (1) profile number
   (2) profile merchant name
   (3) amount to send
   (4) amount last sent
   (5) date last sent -continued
   (6) next date to send
   (7) response (approved/denied)
   (8) card issuing authorization number from host
   (9) retrieval reference number
   (10) sequence number of last transaction
   STRUCTURE- The profile list will always be stored in prifile number order.

The profile number is selected by the host to signify a specific bill pay account. It references both the merchant number and also the merchant internal account for that user. The profile number is translated in the host to provide the merchant with the user specific information needed to credit the customer's account once a bill is paid.

The retrieval reference number is generated by the host to aid in tracking a transaction within the processing system. The retrieval reference number is built of the least significant digit of the year, the gregorian date and a sequence number that is reset at the beginning of each day and incremented for each transaction served by the host system 80.

Figure 5A:
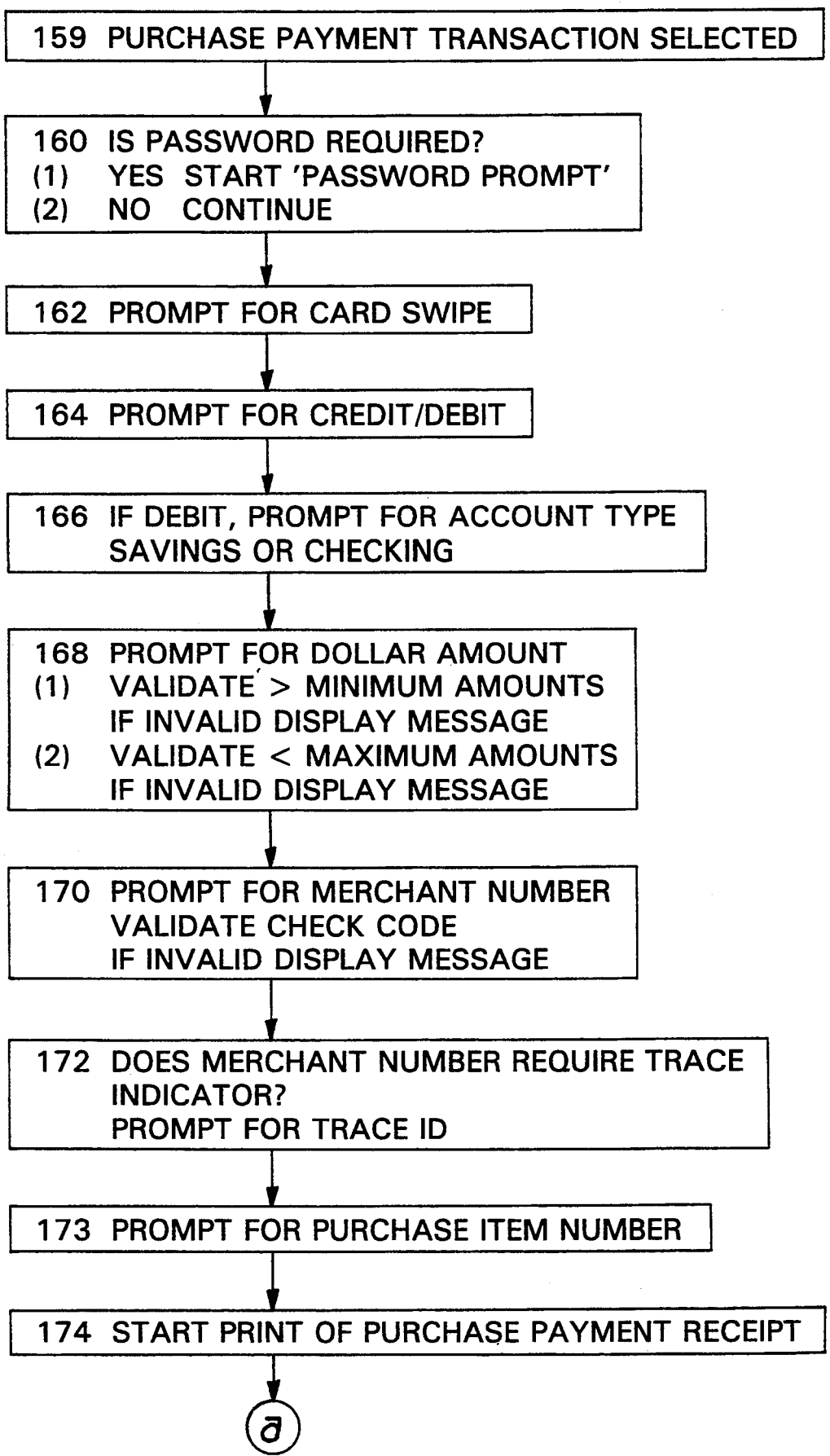
FIGS. 5A and 5B are a flow chart for a purchase payment transaction.
Figure 5B:
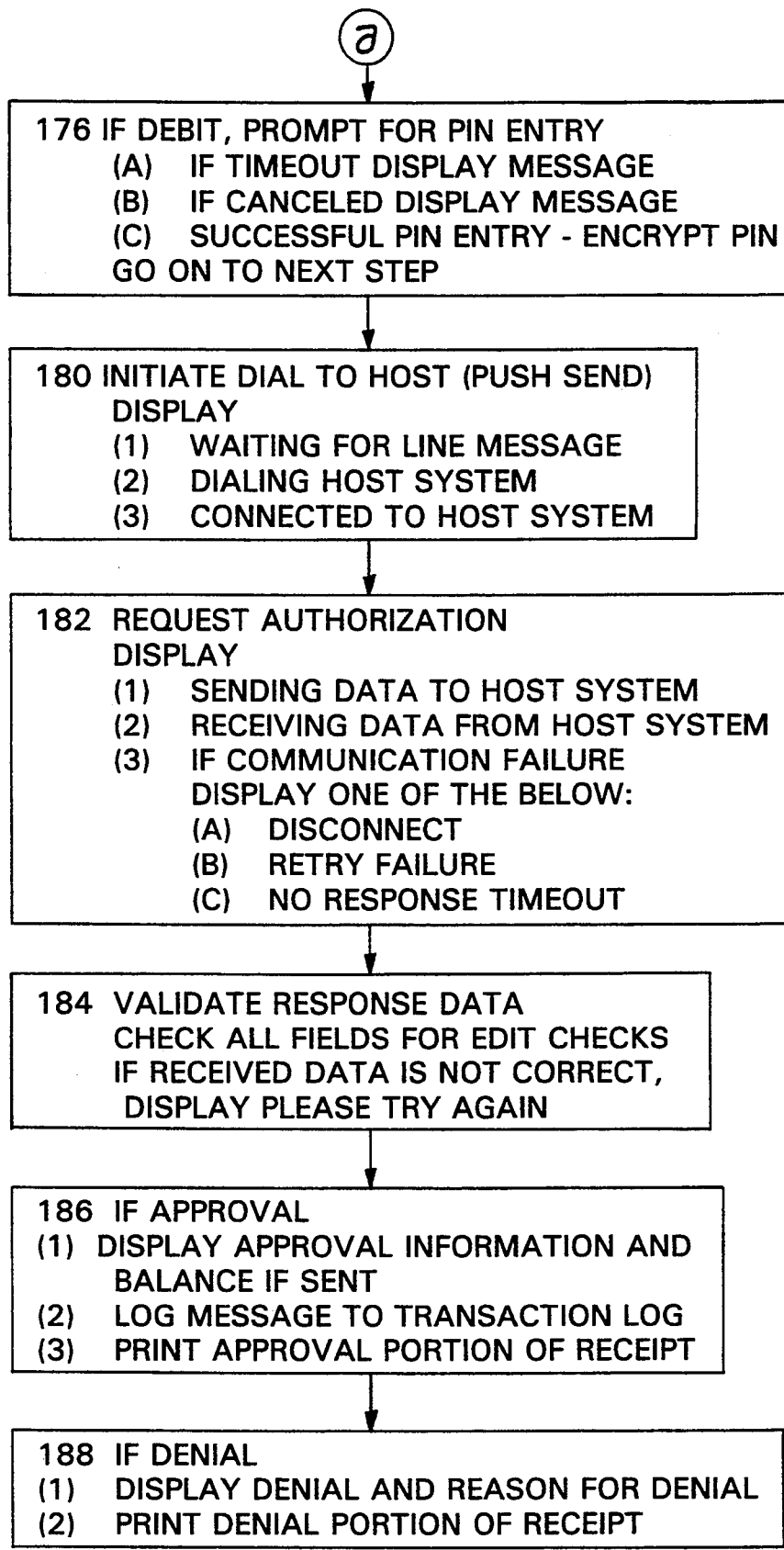
Figure 7B:
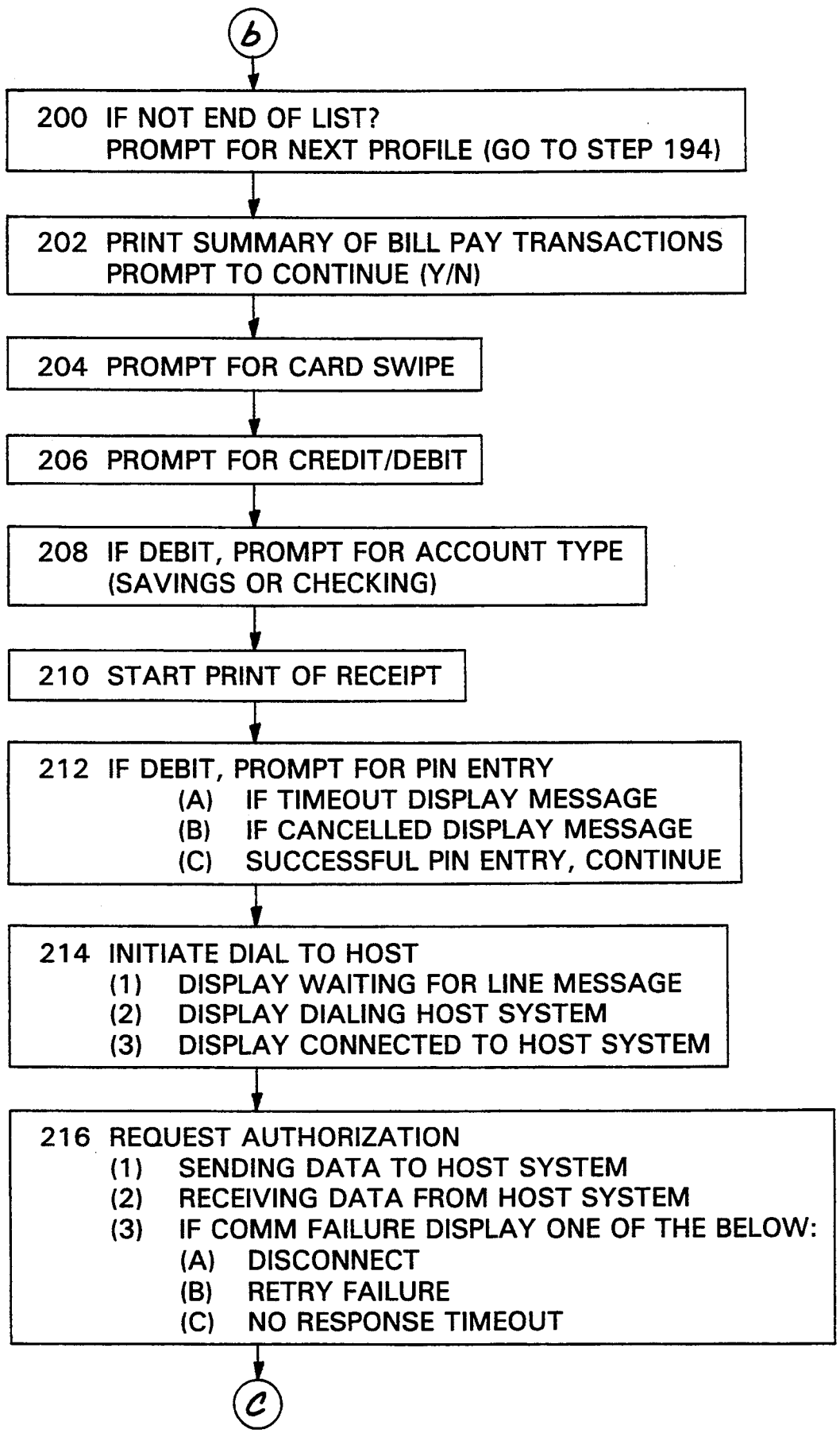
Figure 7C:
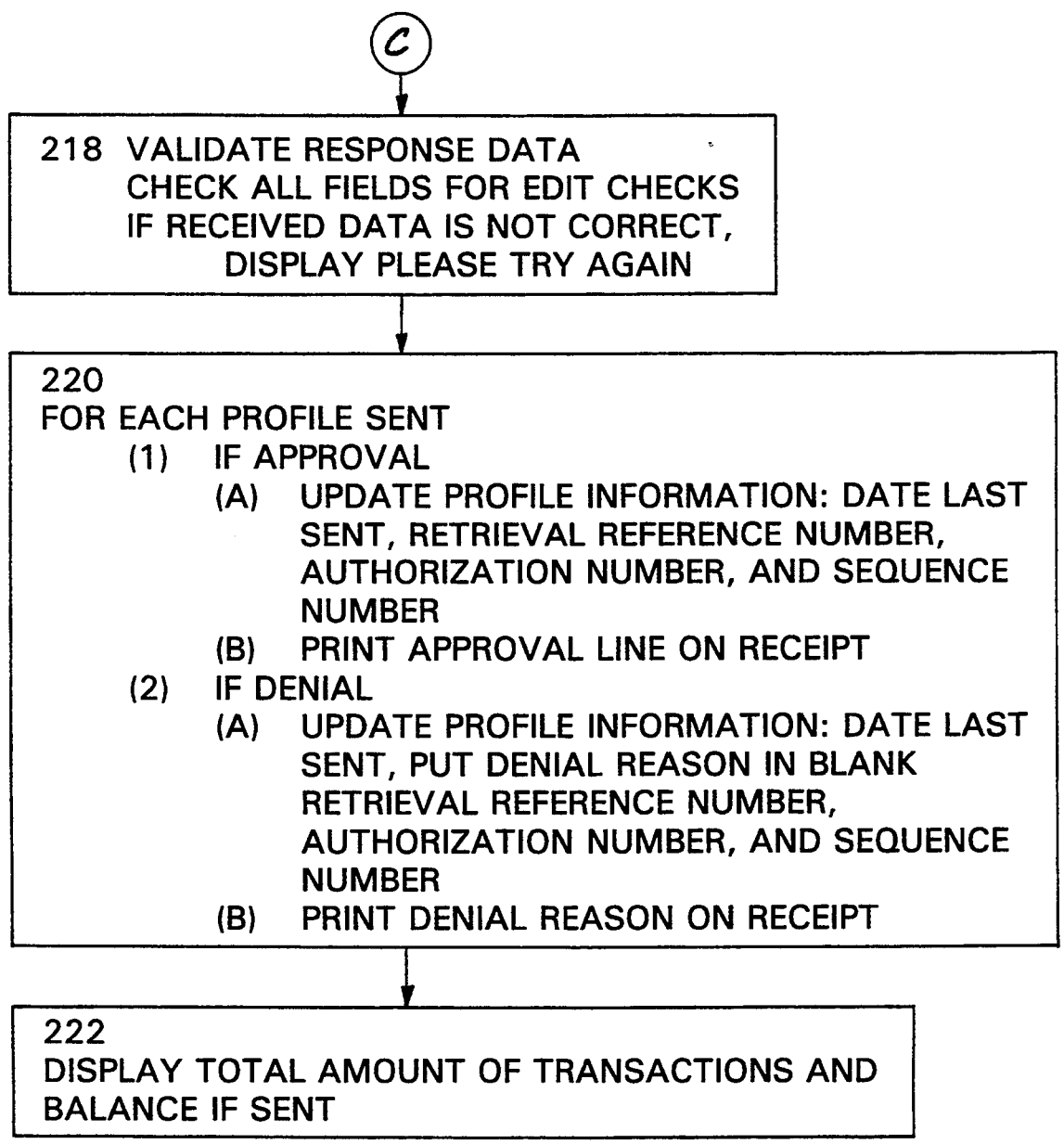
Figure 9:
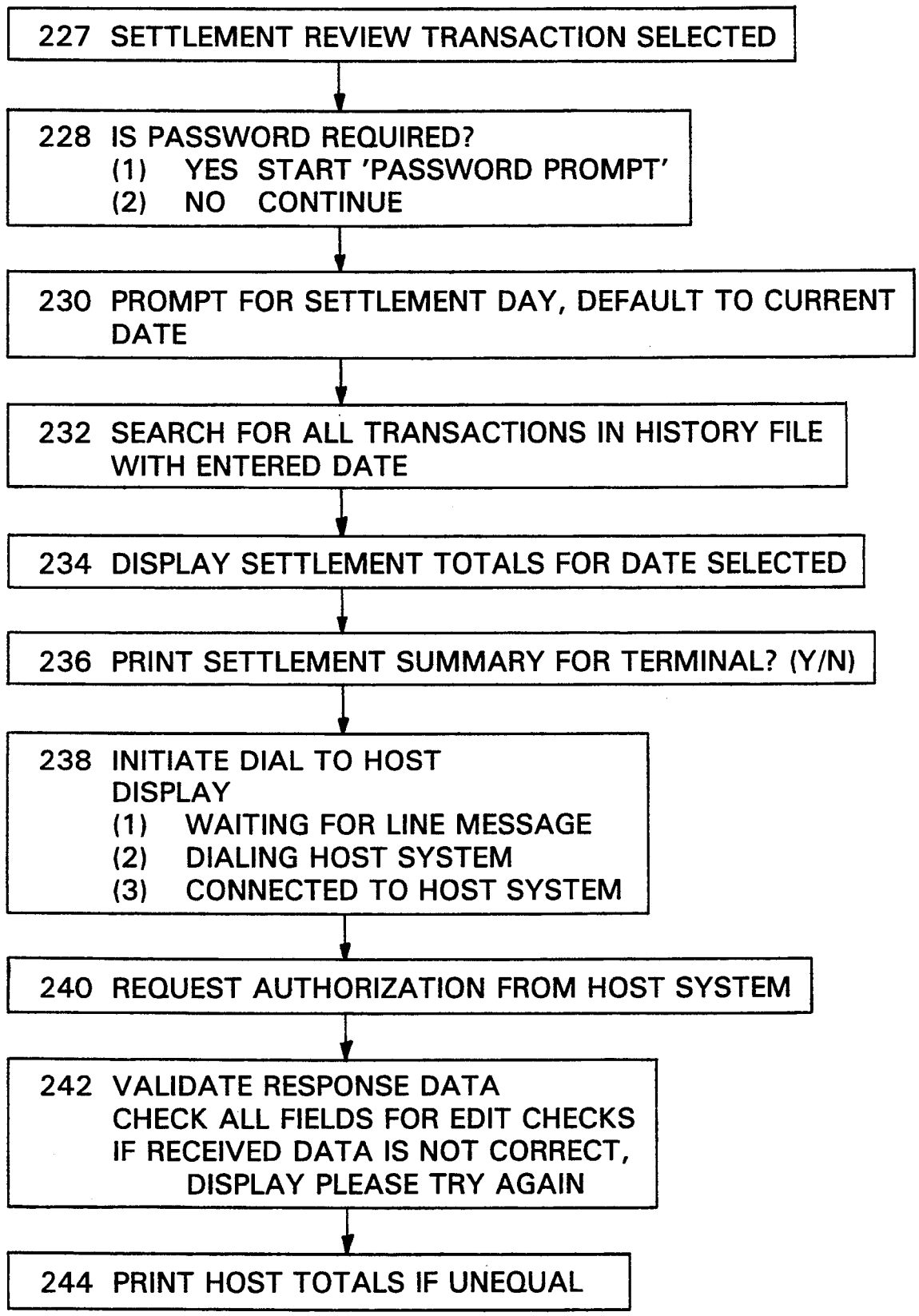
FIG. 9 is a flow chart of a settlement review transaction.

The terminal 10 and host system 80 supports several types of transactions. The purchase payment transaction requests an authorization for a purchase from the selected merchant. FIG. 5 charts steps 159 to 188 for a purchase payment transaction and FIG. 6 is a purchase payment transaction receipt. The bill payment transaction provides a means for reviewing bill payment type transactions by inspecting the profile list and then initiating the actual money transfer to the selected merchants in the profile list. FIG. 7 charts steps 191 to 222 for a bill payment transaction and FIG. 8 is a bill payment transaction receipt. FIG. 9 charts steps 227 to 244 for a settlement review transaction and FIG. 10 is a settlement review receipt.

The purchase payment transaction is begun by communicating with a merchant and selecting an item. This could be done over the phone or from a catalog. Then payment is sent via the purchase payment transaction. The steps outlined in FIG. 5 include: 160 entering a password if required; 162 prompting for a card swipe; 164 prompting for credit/debit; 166 if debit, prompting for account type, savings or checking; 168 prompting for dollar amount and validating that the dollar amounts are within range limits set by card issuing authority; 170 prompting for merchant number and validating check code; 172 prompting for trace indicator, which uniquely identifies a specific customer, if desired by merchant; 173 prompting for a purchase item number; 174 starting print of purchase payment receipt; 176 if debit, then prompting for PIN entry and encrypting PIN using derived unique key per transaction algorithm (DUKPT); 180 initiating dial to host (user pushes SEND key 24) and displaying status; 182 requesting authorization from card issuing authority and displaying status; 184 validating response data; 186 if approval, displaying approval information and balance if sent, logging message to transaction log, printing approval portion of receipt; and 188 if denial, displaying denial and reason for denial and printing denial portion of receipt.

FIG. 6 shows a purchase payment receipt. The receipt items include: terminal name and address from the customer supplied information, the date and time from the host, the amount of the transaction, the account number and expiration date from the credit or debit card, the terminal number, the merchant number, the trace number, the purchase item number, the account type savings or checking, the sequence number, the authorization number from the card issuing authority and approved or denied, the retrieval reference number generated at host, which is a combination of the date and the host sequence number and provides a method of tracing the transaction through the host system, and the merchant name.

The bill payment transaction provides a means for reviewing a profile list and selecting which bills to pay. The steps as outlined in FIG. 7 include: 192 prompting for a password; 194 prompting for a profile number, wherein numeric entry and ENTER 18 displays specific profile, ENTER key 34 alone presents the first profile number, CLEAR key 22 jumps to print, and an invalid profile number results in prompting for the profile number again; 196 displaying profile data: profile number, profile merchant name, amount to send, amount last sent, date last sent, next date to send, response (approved/denied), card issuing authorization number from host, retrieval reference number of last transaction, and sequence number of last transaction; 198 prompting whether to pay this bill, if yes, (user pushes YES/ENTER key 18) which marks profile as active, prompting for dollar amount and displaying the old amount as default, validating amount, and blanking: date last sent, retrieval reference number, sequence number and authorization number for this transaction: if no, (user pushes NO/CANCEL key 20) then continue; 200 if not end of profile list, prompting for next profile and repeating steps 192 to 200; 204 prompting for card swipe; 206 prompting for credit/debit; 208 if debit, prompting for account type, savings or checking; 210 starting print of receipt; 212 if debit, prompting for PIN entry; 214 initiating dial to host and displaying status; 216 requesting authorization from card issuing authority via host system 80; 218 validating response data; 220 for each profile sent, if approval, updating profile information: date last sent, retrieval reference number, card issuing authorization number, sequence number, print approval line on receipt; or if denial, updating profile information: date last sent, place denial reason in retrieval reference number, authorization number, and sequence number, and printing denial reason on receipt; and 222 displaying total amount of transactions and balance if sent.

FIG. 8 shows a bill payment transaction receipt. The receipt items include: terminal name and address from the customer supplied information, the date and time from the host, the account number and expiration date from the credit or debit card, the terminal number, the account type, and then profile information for each profile transaction: the merchant number, the merchant name, the amount, the authorization number, the sequence number and the retrieval reference number, and finally the total amount approved and paid.

It is possible to print the profile list, which gives the status of all bill pay transactions, and also to print the transaction log for purchase payment transactions.

It is also possible to cancel purchase payment transactions, which would be used for returns or for just canceling an order shortly after executing a purchase payment transaction. If mistakes are made in bill payment then it is also possible to cancel a bill payment.

The settlement review transaction provides a means to do daily settlement of the terminal 10 with the host system 80. The steps as outlined in FIG. 9 include: 228 prompting for password; 230 prompting for settlement day, defaulting to current date; 232 searching for all transactions in history file with entered date; 234 displaying settlement totals for date selected; 236 printing settlement summary for terminal (user pushes YES/ENTER key 18); 238 initiating dial to host and display status; 240 requesting authorization from host system 80; 242 validating response data; and 244 printing host totals if unequal.

FIG. 10 shows a settlement review receipt. The receipt items include: terminal name and address from the customer supplied information; the date and time from the host; the terminal number; the credit transaction sales count, sales amount, return count, and return amount; the debit transaction sales count, sales amount, return count, and return amount; and the net count and net amount all for the terminal; and if the host totals are not in balance with the terminal then the corresponding data from the host for the date in question.

The terminal 10 together with the host system 80 provide a new apparatus and method for the consumer to perform transactions from either the home or office.

It is thought that the present invention and many of its attendant advantages will be understood from the foregoing description and it will be apparent that various changes may be made in the form, construction and arrangement of the parts thereof and in the methods used without departing from the spirit and scope of the invention or sacrificing all of its material advantages, the forms hereinbefore described being merely a preferred or exemplary embodiments thereof.

We claim:

1. A system including a host computer system for allowing a user to conduct remote point of sale transactions, said system comprising:

an unitary terminal having a top surface;

a QWERTY alphabetic keyboard for entering alphabetic information integral to said terminal and accessible on said top surface of said terminal;

a numeric keypad for entering numeric information integral to said terminal and accessible on said top surface of said terminal;

a magnetic card reader for reading a magnetically encoded card integral to said terminal and accessible on said top surface of said terminal;

a display integral to said terminal and visible on said top surface of said terminal;

a printer integral to said terminal;

a modem for communication on telephone lines integral to said terminal; and control means for operating said terminal and communicating to said host computer system coupled to said QWERTY alphabetic keyboard, said numeric keyboard, said magnetic card reader, said display, said printer, and said modem;

first memory means coupled to said control means for storing a transaction log of purchase payment transactions stored as a stack wherein each purchase payment transaction in said transaction log comprises a date and time of said purchase payment transaction, an amount of said purchase payment transaction, an account number of said user, a terminal number of said terminal, a merchant number for said purchase payment transaction, a trace number for said purchase payment transaction, a purchased item identifier for said purchase payment transaction, an account type of said user, a transaction sequence number, an authorization number for said purchase payment transaction, a retrieval reference number for said purchase payment transaction, and a merchant name for said purchase payment transaction;

wherein said trace number uniquely identifies a specific user;

wherein said account type specifies a specific account of said user;

wherein said transaction sequence number is incremented by one for each approved transaction;

wherein said authorization number is issued by said host computer system; and wherein said retrieval reference number is generated by said host computer system to aid in tracking a transaction within said system.

2. A system including a host computer system for allowing a user to conduct remote point of said transactions, said system comprising:

an unitary terminal having a top surface;

a QWERTY alphabetic keyboard for entering alphabetic information integral to said terminal and accessible on said top surface of said terminal;

a numeric keypad for entering numeric information integral to said terminal and accessible on said top surface of said terminal;

a magnetic card reader for reading a magnetically encoded card integral to said terminal and accessible on said top surface of said terminal;

a display integral to said terminal and visible on said top surface of said terminal;

a printer integral to said terminal;

a modem for communication on telephone lines integral to said terminal; and control means for operating said terminal and communicating to said host computer system coupled to said QWERTY alphabetic keyboard, said numeric keyboard, said magnetic card reader, said display, said printer, and said modem;

second memory means coupled to said control means for storing a profile list of bill payment transactions wherein each profile in said profile list comprises a profile number, a merchant name, an amount to send, an amount last sent, a last data bill payment was sent, a next data to send bill payment, an approval response, an authorization number, a retrieval reference number, and one of said transaction sequence numbers;

wherein said profile number is unique for each said profile;

wherein said approval response approves or denies said bill payment transaction;

wherein said authorization number is issued by said host computer system;

wherein said retrieval reference number is generated by said host computer system to aid in tracking a transaction within said system; and wherein said transaction sequence number is incremented by one for each approved transaction.

3. A method for allowing a user to conduct remote bill payment comprising the steps of:

providing an unitary terminal having a QWERTY alphabetic keyboard for entering alphabetic information, a numeric keyboard for entering numeric information, a magnetic card reader for reading a magnetically encoded card, a display, a printer, a modem for communication on telephone lines, a control device coupled to said QWERTY alphabetic keyboard, said numeric keyboard, said magnetic card reader, said display, said printer, and said modem, and a memory coupled to said control device;

providing a host computer system coupled to said terminal by said modem;

providing a profile list of bill payment transactions stored in said memory of said terminal wherein each profile in said profile list comprises a profile number, an amount last sent, the date bill payment last sent, an authorization number, a retrieval reference number, and a sequence number;

prompting user to select and user selecting a profile from said profile list;

displaying profile data to user;

prompting user to decide whether to pay this bill for this profile and if user decides yes, prompting user for dollar amount and displaying the amount last sent as default and user entering dollar amount, blanking the date bill payment last sent, the retrieval reference number, the sequence number and the authorization number for this transaction, and if no, then continuing to the next step;

repeating the preceding three steps until user decides to go to next step;

prompting user to swipe and user swiping card through the magnetic card reader coupled to said remote point of sale terminal;

prompting user to select and user selecting credit or debit;

if debit, prompting user to enter and user entering account type, savings or checking;

if debit, then prompting user to enter and user entering a personal identification number entry and encrypting the entered personal identification number;

dialing said host computer system;

requesting authorization from a card issuing authority via said host computer system;

if authorization granted, incrementing a retrieval reference number in said host computer system and sending said retrieval reference number to said terminal;

if authorization granted, sending an authorization number via said host computer system from the card issuing authority to said terminal;

if authorization granted, incrementing said sequence number for each approved transaction;

if authorization granted, updating profile information for each profile selected for bill payment by updating the date that bill payment was last sent, the amount last sent, the retrieval reference number to the retrieval reference number sent by said host computer system for that profile bill payment, the authorization number to the authorization number sent by the card issuing authority via said host computer system to said terminal, and the sequence number;

if authorization denied, updating profile information for each profile selected for bill payment by placing denial reason in location in profile for retrieval reference number, authorization number, and sequence number; and printing receipt for bill payment transaction.

4. A method for allowing a user to conduct remote purchase payment transactions comprising the steps of:

providing an unitary terminal having a QWERTY alphabetic keyboard for entering alphabetic information, a numeric keyboard for entering numeric information, a magnetic card reader for reading a magnetically encoded card, a display, a printer, a modem for communication on telephone lines, a control device coupled to said QWERTY alphabetic keyboard, said numeric keyboard, said magnetic card reader, said display, said printer, and said modem, and a memory coupled to said control device;

providing a host computer system coupled to said terminal by said modem;

providing a transaction log of purchase payment transactions stored as a stack in said memory of said terminal wherein each purchase payment transaction in said transaction log comprises a date and time, amount, account number, a terminal number, a merchant number, an account type, a sequence number, an authorization number, and a retrieval reference number for said purchase payment transaction;

prompting user to swipe and user swiping card through a magnetic card reader coupled to said terminal;

prompting user to select and user selecting credit or debit;

if debit, prompting user to enter and user entering account type, savings or checking;

if debit, then prompting user to enter and user entering a personal identification number entry and encrypting the entered personal identification number;

prompting user to enter and user entering dollar amount and validating that the dollar amounts are within range limits set by card issuing authority;

prompting user to enter and user entering merchant number;

prompting user to enter and user entering purchase item number;

dialing said host computer system;

requesting authorization from card issuing authority;

if authorization granted, incrementing a retrieval reference number in said host computer system and sending said retrieval reference number to said terminal;

if authorization granted, incrementing said sequence number for each approved transaction;

if authorization granted, logging message comprising a date and time received from said host computer system, amount, account number and expiration date, a terminal number, a merchant number, an account type, said sequence number, an authorization number, and a retrieval reference number sent by said host computer system for said purchase payment transaction to said transaction log and printing receipt; and if authority denied, displaying reason for denial and printing receipt.

5. A method for allowing a user to conduct remote settlement review comprising the steps of:

providing an unitary terminal having a QWERTY alphabetic keyboard for entering alphabetic information, a numeric keyboard for entering numeric information, a magnetic card reader for reading a magnetically encoded card, a display, a printer, a modem for communication on telephone lines, a control device coupled to said QWERTY alphabetic keyboard, said numeric keyboard, said magnetic card reader, said display, said printer and said modem, and a memory coupled to said control device;

providing a host computer system coupled to said terminal by said modem;

providing a transaction log of purchase payment transactions stored as a stack in said memory of said terminal wherein each purchase payment transaction in said transaction log comprises a date and time, amount, account number and expiration date, a terminal number, a merchant number, an account type, a sequence number, an authorization number, and a retrieval reference number for said purchase payment transaction;

prompting for a settlement date and user entering a settlement date or defaulting to current date;

searching for all transactions in transaction log with entered date;

displaying settlement totals for date selected;

printing settlement review receipt for terminal comprising the terminal name and address, the date and time, the terminal number, the date for the credit transactions for the date including the sales count, the sale amount, the return count, and the return amount and the data for the debit transactions for the date including the sales count, the sales amount, the return count, and the return amount, and the net data for the date including the net count and net amount;

dialing said host computer system;

requesting authorization from said host computer system;

transmitting terminal data to said host computer system;

comparing terminal data with data for same date in said host computer system; and if said host computer system data and terminal data do not agree, then sending said host computer system data to said terminal and printing said host computer system data comprising said host computer system data for the credit transactions for the date including the sales count, the sales amount, the return count, and the return amount and the data for the debit transactions for the date including the sales count, the sales amount, the return count, and the return amount, and the net data for the data including the net count and net amount on said settlement review receipt.

* * * * *